(12) United States Patent
Silver

(10) Patent No.: US 11,176,913 B2
(45) Date of Patent: Nov. 16, 2021

(54) DEVICE AND METHOD FOR INTRODUCING DIFFERENT EMBOUCHURES

(71) Applicant: Lester Silver, Livingston, NJ (US)

(72) Inventor: Lester Silver, Livingston, NJ (US)

( * ) Notice: Subject to any disclaimer, the term of this patent is extended or adjusted under 35 U.S.C. 154(b) by 0 days.

(21) Appl. No.: 16/787,161

(22) Filed: Feb. 11, 2020

(65) Prior Publication Data

US 2020/0265811 A1    Aug. 20, 2020

Related U.S. Application Data

(60) Provisional application No. 62/806,037, filed on Feb. 15, 2019.

(51) Int. Cl.
*G10D 7/10* (2006.01)
*G10D 7/06* (2020.01)
*G09B 15/00* (2006.01)

(52) U.S. Cl.
CPC ............ *G10D 7/10* (2013.01); *G09B 15/00* (2013.01); *G10D 7/06* (2013.01)

(58) Field of Classification Search
CPC ............ G10D 7/10; G10D 7/06; G09B 15/00
USPC ........................................................ 84/470 R
See application file for complete search history.

(56) References Cited

U.S. PATENT DOCUMENTS

| | | | | |
|---|---|---|---|---|
| 1,122,207 A * | 12/1914 | Kloepfel | ................. | G10D 7/10 84/387 R |
| RE22,949 E * | 12/1947 | Forssberg | ................. | G10D 7/10 84/387 R |
| 3,291,670 A * | 12/1966 | Usab | ................. | F16L 41/03 156/245 |
| 3,451,302 A * | 6/1969 | Lamart | ................. | G10D 7/10 84/465 |
| 3,563,127 A * | 2/1971 | Funakoshi | ................. | G10D 7/00 84/330 |
| 3,853,034 A * | 12/1974 | Vale | ................. | G10D 7/10 84/465 |
| 4,245,544 A * | 1/1981 | Holland | ................. | G10D 7/10 84/465 |
| 4,304,166 A * | 12/1981 | Stefano | ................. | G10G 5/00 84/385 A |
| 4,378,724 A * | 4/1983 | Lamart | ................. | G09B 15/00 84/465 |
| 4,516,464 A * | 5/1985 | Hastings | ................. | G10D 7/10 84/387 R |
| 4,770,080 A * | 9/1988 | Jivoin | ................. | G10D 7/02 84/330 |

(Continued)

OTHER PUBLICATIONS

Quercetti, Saxoflute Super, 2020, https://www.quercettistore.com/collections/building/products/saxoflute-1 (Year: 2020).*

(Continued)

*Primary Examiner* — Christina M Schreiber
(74) *Attorney, Agent, or Firm* — Thomas L. Adams

(57) ABSTRACT

A device has a plurality of different mouthpieces that can be mounted on an elongate body. Each mounted mouthpiece is spaced from the central axis of the elongate body. In order to introduce different embouchures, a music student can blow into successive ones of the plurality of different mouthpieces. The student can hold the elongate body when using the device.

27 Claims, 6 Drawing Sheets

(56) References Cited

U.S. PATENT DOCUMENTS

| | | | | |
|---|---|---|---|---|
| 4,909,123 A * | 3/1990 | Butenschon, III | G10D 7/066 84/382 |
| 5,027,685 A * | 7/1991 | Lenz | G10D 9/047 84/330 |
| 5,142,707 A * | 9/1992 | Prue | A61L 2/18 222/522 |
| 5,624,140 A * | 4/1997 | Allen | B29C 66/81413 285/123.1 |
| 6,087,572 A * | 7/2000 | Dillon | G10D 9/03 84/387 R |
| 6,342,662 B1 * | 1/2002 | Chang | G10D 7/02 84/330 |
| 7,145,067 B2 * | 12/2006 | Pfortmiller | A01M 31/004 84/380 R |
| 7,465,864 B2 * | 12/2008 | Heintz | G09B 15/00 84/2 |
| 7,608,767 B1 * | 10/2009 | Barth | G10D 9/03 84/383 R |
| 8,334,447 B2 * | 12/2012 | Masuda | G10H 5/007 84/386 |
| 8,975,499 B1 * | 3/2015 | Stoutenborough | G10G 7/00 84/465 |
| 9,299,267 B2 * | 3/2016 | Perez | G10G 7/00 |
| 9,691,368 B2 * | 6/2017 | Kang | G10H 1/0551 |
| 2003/0073542 A1 * | 4/2003 | Patton | A63B 23/032 482/10 |
| 2008/0087159 A1 * | 4/2008 | Heintz | G09B 15/00 84/470 R |
| 2011/0028904 A1 * | 2/2011 | Watanabe | A61M 16/0484 604/164.09 |
| 2012/0312404 A1 * | 12/2012 | Choi | F16L 37/252 137/883 |
| 2014/0353245 A1 * | 12/2014 | Hoefken | B01D 21/2427 210/513 |
| 2015/0096431 A1 * | 4/2015 | Perez | G09B 15/00 84/470 R |
| 2015/0228258 A1 * | 8/2015 | Dixon | G10D 7/00 84/398 |
| 2016/0143254 A1 * | 5/2016 | Shaanti | A01K 27/008 119/719 |
| 2016/0158661 A1 * | 6/2016 | Shaanti | G10D 7/00 84/330 |
| 2016/0319975 A1 * | 11/2016 | Nasu | F16L 47/02 |
| 2019/0316549 A1 * | 10/2019 | Notter | F01N 3/30 |
| 2019/0376632 A1 * | 12/2019 | Rush | F16L 41/04 |
| 2020/0146533 A1 * | 5/2020 | Harada | G02B 23/24 |
| 2020/0146537 A1 * | 5/2020 | Harada | A61B 1/00101 |
| 2020/0265811 A1 * | 8/2020 | Silver | G09B 15/00 |
| 2021/0010252 A1 * | 1/2021 | Preisig | E03C 1/24 |

OTHER PUBLICATIONS

Quercetti, Store, Saxoflute Super listed for sale, cod:4172, Jun. 24, 2011, https://web.archive.org/web/20110624232207/http://www.quercettistore.com/store/store (Year: 2011).*

* cited by examiner

DEVICE AND METHOD FOR INTRODUCING DIFFERENT EMBOUCHURES

CROSS-REFERENCES TO RELATED APPLICATIONS

This application claims the benefit of U.S. Provisional Patent Application Ser. No. 62/806,037, filed 15 Feb. 2019, the contents of which are hereby incorporated by reference herein.

BACKGROUND OF THE INVENTION

1. Field of the Invention

The present invention relates to devices that permit music students to experience different embouchures.

2. Description of Related Art

Choosing a musical instrument can be complicated. At the start, a student should become aware of the different techniques required for different instruments. A student should understand the nature of buzzing, reed vibration, embouchure holes, tonguing and blow through pressure before choosing a specific instrument. However, some aspiring musicians, especially young ones, may be influenced by factors unrelated to the suitability of the instrument. The student can be influenced by the instrument's appearance or sound, instruments chosen by friends or family members, instruments already owned, etc.

Ideally, the student will be given an opportunity to try each of a variety of instruments to determine which instrument suits the student best. It would be beneficial for students to be given an opportunity to test mouthpieces for instruments such as saxophones, large bore euphoniums and baritones, large bore trombones, and tubas, as well as mouthpieces for trumpets, French horns, cornets, flugelhorns, and small bore euphoniums, baritones, and trombones. A student can also be given an opportunity to try blowing across an embouchure hole of a flute or the like.

In many cases a teacher or school may not have the resources to provide each student with different instruments that the students can test. Even if the resources exist, students and parents will be concerned about the sharing of mouthpieces. In particular, shared mouthpieces must be carefully cleaned before being passed on to another student. The possibility of careless or inadequate cleaning will leave students and parents concerned about infections being transmitted between students. In some cases these concerns about hygiene may preclude a student from trying different instruments.

Devices with multiple mouthpieces have been proposed to allow students to try different mouthpieces. However, the design of these devices restricted the number of mouthpieces that could simultaneously be made available to the student.

See also U.S. Pat. Nos. 3,853,034; 7,145,067; 7,465,864; and 9,299,267, as well as US Patent Application Pub. No. 2016/0143254.

SUMMARY OF THE INVENTION

In accordance with the illustrative embodiments demonstrating features and advantages of the present invention, there is provided a device for introducing different embouchures to a music student. The device has a plurality of mouthpieces. The device also has an elongate body with a central axis. The elongate body is adapted to support the plurality of mouthpieces. Each of the plurality of mouthpieces has an internal airway providing an air passage. The airway of each of the plurality of mouthpieces are spaced outwardly from the central axis of the elongate body.

In accordance with another aspect of the invention, a method is provided that employs a plurality of different mouthpieces adapted to be mounted on an elongate body that has a central axis. Each of the plurality of mouthpieces are spaced outwardly from the central axis of the elongate body. The method includes the step of selecting successive ones of the plurality of mouthpieces. The method also includes the step of placing the mouth of a music student on successive ones of the plurality of different mouthpieces and holding the elongate body when the mouth is placed on each of the successive ones. Another step is blowing in turn into each of the successive ones of the plurality of mouthpieces in order to introduce different embouchures to the music student.

In a disclosed embodiment, a tubular elongate body is closed on one end and open on the other end. Three mouthpieces are mounted on this elongate body, one next to the closed end and two next to the open end. The mouthpiece next to the closed end is a large bell-shaped mouthpiece of the type normally associated with a trombone, baritone, or the like. This mouthpiece is attached to and communicates with a tubular connector mounted alongside the elongate body. The axis of the connector and mouthpiece are parallel to and spaced from the central axis of the elongate body. Next to the open end of the elongate body is a smaller bell-shaped mouthpiece of a type that would normally be associated with a trumpet or the like. As before, this mouthpiece next to the open end is coaxial with a tubular connector mounted alongside the elongate body. The axes of the two bell-shaped mouthpieces and their connectors are coplanar and spaced from the central axis of the elongate body. Both bell-shaped mouthpieces communicate with their respective tubular connectors and air blown into the mouthpieces is exhausted to the outside through their associated tubular connectors.

The third mouthpiece is of the type used in a clarinet or saxophone and has a reed associated therewith. This third mouthpiece is connected through a connector that is attached to the side of the elongate body. This connector and the third mouthpiece are coaxial and angularly diverge from the elongate body at an angle of approximately 45°. The third mouthpiece does not communicate with the elongate body, and instead, air blown into this mouthpiece is discharged through a vent on the side of its associated connector.

The axes of the three mouthpieces are coplanar with the central axis of the elongate body. It will be noted that two mouthpieces are mounted at the same (open) end of the elongate body. This is possible because these two mouthpieces are spaced away from the elongate body. Specifically, the bell-shaped mouthpiece lies on an axis that is parallel to and spaced from the axis of the elongate body. Also, the angularly disposed mouthpiece is significantly spaced from the neighboring mouthpiece and the elongate body.

An embouchure hole located at the closed end of the elongate body penetrates the elongate body and communicates with the air channel inside the body. This embouchure hole includes a lip plate. A student can blow on this embouchure hole to simulate playing a flute. This embouchure hole at the closed end of the elongate body is circumferentially spaced approximately 90° from the nearby bell-shaped mouthpiece. This nearby mouthpiece is itself spaced from the axis of the elongate body and leaves adequate clearance for playing of the embouchure hole. Also, air blown across the embouchure hole causes an air flow in the elongate body that is communicated through the open end of the elongate body.

In another disclosed embodiment, the distal ends of the tubular connectors for the two bell-shaped mouthpieces communicate with the internal air channel inside the elongate body.

In still another disclosed embodiment, all three of the foregoing mouthpieces are located at the closed end of the elongate body. In this embodiment all three of the mouthpieces and their respective connectors angularly diverge from the axis of the elongate body at an angle of approximately 45°. The three mouthpieces are arranged like a tripod, that is, each lie in separate planes that are equiangularly spaced apart by 120°. The three mouthpieces and their connectors communicate with the air channel inside the elongate body and eventually discharge from the open end of the elongate body.

This embodiment also has an embouchure hole and lip plate centrally spaced from the three mouthpieces. This embouchure hole is circumferentially spaced equidistantly from the planes of an adjacent pair of the mouthpieces. When the embouchure hole is not being played it can be stopped with an elastomeric plug that is inserted into the hole to avoid an undesired bleed off of air. Alternatively, the embouchure hole can be stopped with a plate that slides over the lip plate to cover the embouchure hole.

Also in this embodiment, an aligned series of fingering holes located between the open end of the elongate body and the embouchure hole communicate with the air channel inside the elongate body. These fingering holes can be played much like a recorder to change the pitch of tones that are produced by the embouchure hole or by one of the three mouthpieces.

It will be understood that in some embodiments the device may have more or fewer than three mouthpieces. Also, the mouthpieces can be placed at various angles at various locations along the length of the elongate device. Likewise, the embouchure hole can be placed at various locations along the length of the elongate body.

BRIEF DESCRIPTION OF THE DRAWINGS

The above brief description as well as other objects, features and advantages of the present invention will be more fully appreciated by reference to the following detailed description of illustrative embodiments in accordance with the present invention when taken in conjunction with the accompanying drawings, wherein.

DETAILED DESCRIPTION

Figure 1:
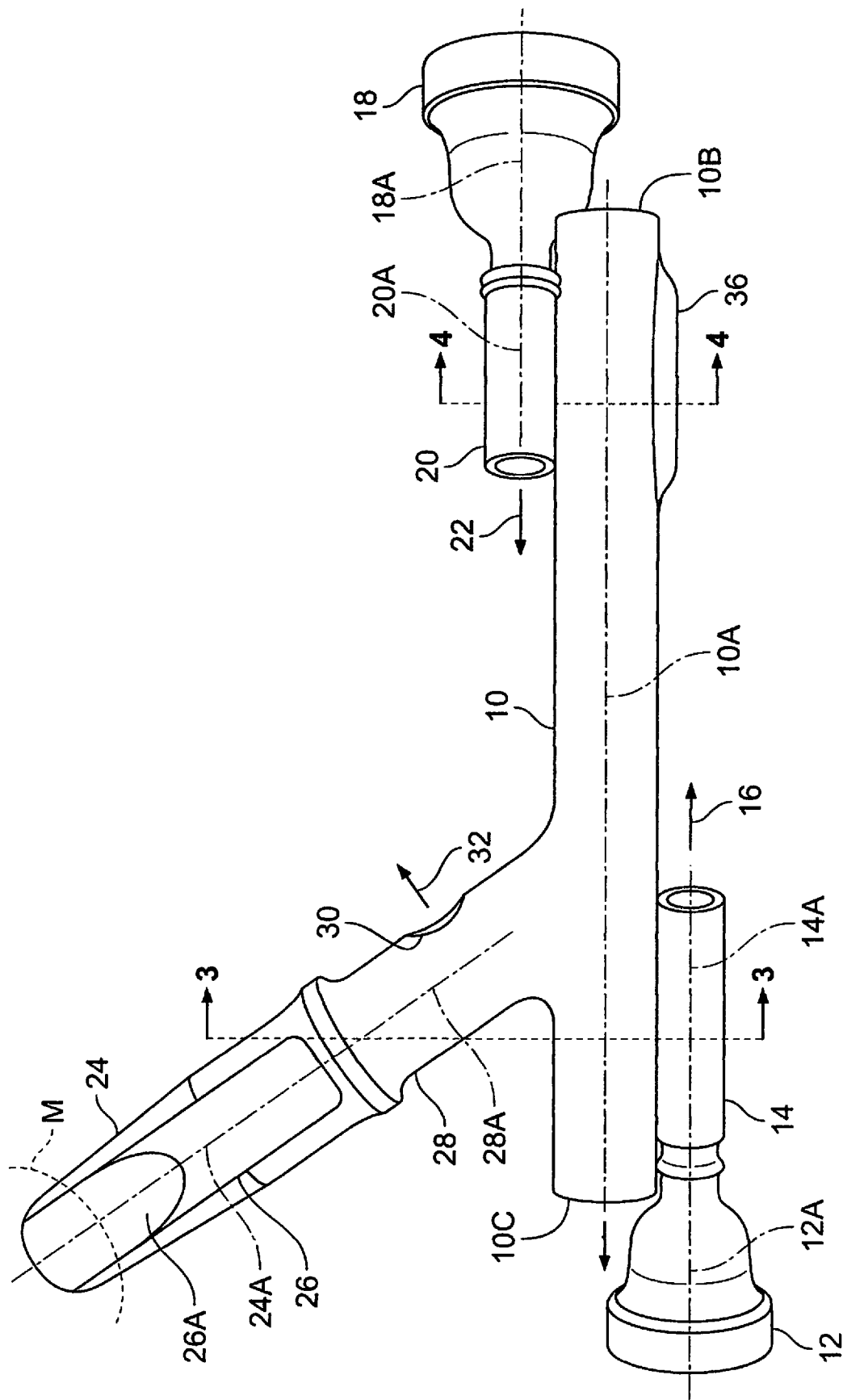
FIG. 1 is a dorsal view of a device in accordance with the principles of the present invention, with the right of the device projecting toward the top of the drawing.

Referring to FIGS. 1-4, the illustrated device has an elongate body 10 that extends along central axis 10A between closed end 10B and open end 10C. In this embodiment elongate body 10 is tubular along most of its length to encompass an air channel (channel 10D of FIGS. 3 and 4).

Bell-shaped mouthpiece 12 is connected to a tubular connector 14 that is mounted alongside elongate body 10. Mouthpiece 12 is of a type that would normally be associated with a trumpet or the like. Mouthpiece 12 has a working axis 12A that is aligned with axis 14A of connector 14. Mouthpiece 12 has an internal airway providing an air passage into the air passage of connector 14. It will be noticed that coaxial axes 12A and 14A and their associated airways are parallel to and spaced from central axis 10A.

In this embodiment mouthpiece 12 is integrally molded with connector 14. Also, connector 14 will be integrally molded with elongate body 10, in this embodiment. In other embodiments, mouthpiece 12 may be a separate, removable and exchangeable item that is inserted into or around connector 14.

Bell-shaped mouthpiece 18 is connected to tubular connector 20 that is mounted alongside elongate body 10. Mouthpiece 18 is a larger mouthpiece of a type that would normally be associated with a trombone, baritone, or the like. Mouthpiece 18 has a working axis 18A that is aligned with axis 20A of connector 20. Mouthpiece 18 has an internal airway providing an air passage into the air passage of connector 20. It will be noticed that coaxial axes 18A and 20A and their associated airways are parallel to and spaced from central axis 10A.

In this embodiment mouthpiece 18 is integrally molded with connector 20. Also, connector 20 will be integrally molded with elongate body 10, in this embodiment. In other embodiments, mouthpiece 18 may be a separate, removable and exchangeable item that is inserted into or around connector 20.

Axes 10A, 12A, 14A, 18A, and 20A are coplanar. Relative to central axis 10A, coaxial axes 18A and 20A are in a position diametrically opposite coaxial axes 12A and 14A.

A third mouthpiece 24 has an internal airway along axis 24A, which provides an air passage into tubular connector 28, whose axis 28A aligns with axis 24A. Coaxial axes 24A and 28A are angularly oriented to diverge from central axis 10A at an angle of approximately 45°. Thus, for this reason, mouthpiece 24 and connector 28 are spaced from elongate body 10, and leave plenty of clearance for the use of mouthpiece 12. Axes 24A and 28A are coplanar with axes 10A, 12A, 14A, 18A, and 20A.

Figure 2:
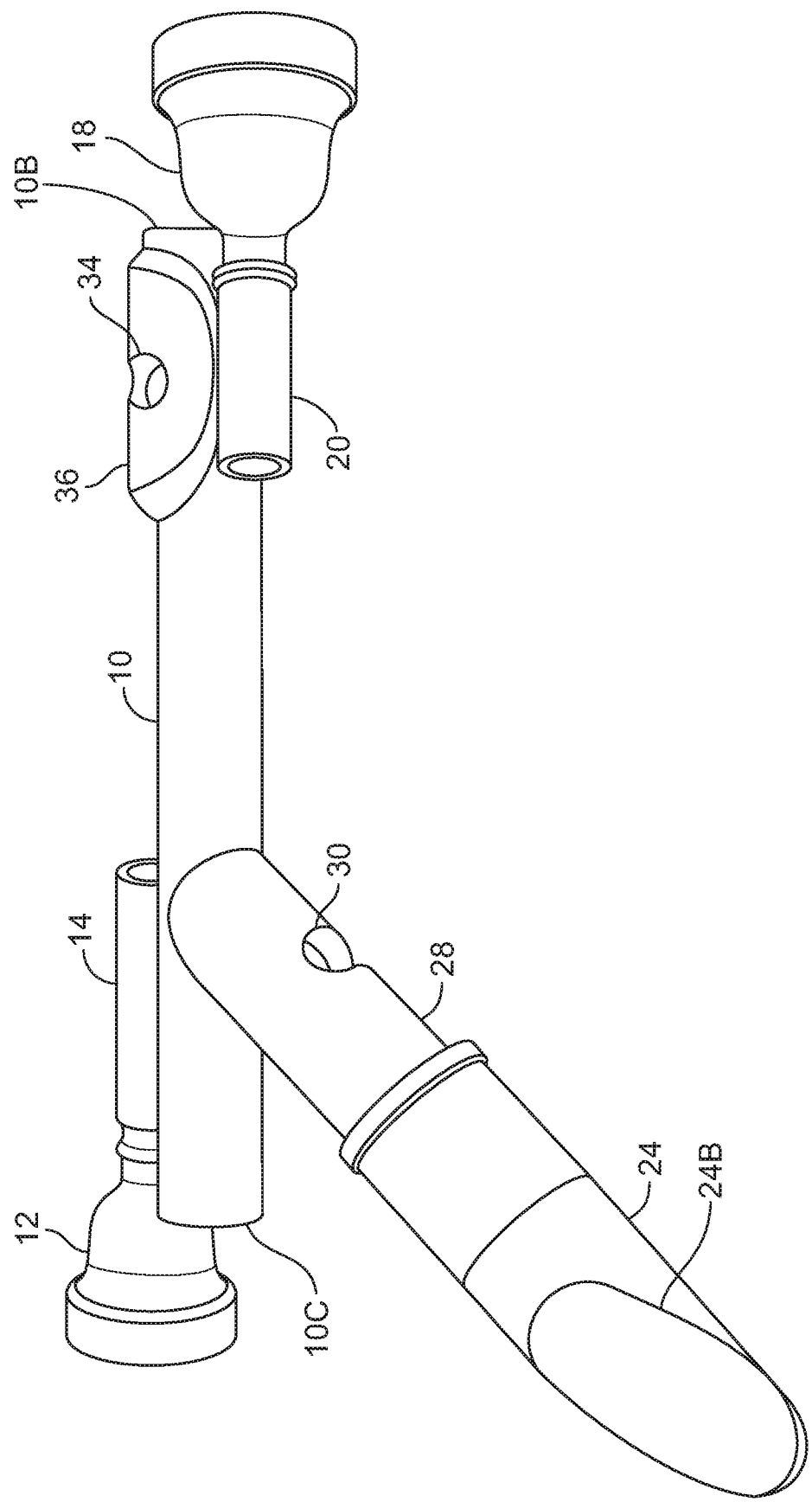
FIG. 2 is a ventral view of the device of FIG. 1, but rotated approximately 30° about its longitudinal axis to slightly depress portions of the device located on the right.

Third mouthpiece 24 is of the type used in a clarinet or saxophone and has a reed 26 laying thereon. The proximal end of reed 26 can be glued to elongate body 10, or in other embodiments, can be secured by an elastic band (not shown) encircling reed 26 and mouthpiece 24. The distal end of reed 26 has the usual tapered region 26A and will vibrate when a student's mouth M is used to blow air across it, in the usual fashion. Air entering mouthpiece 24 travels through it and connector 28, to eventually discharge through side vent 30 as indicated by discharge arrow 32. Accordingly, connector 28 will not communicate with the air passage inside elongate body 10. FIG. 2 shows that the side of mouthpiece 24 opposite reed 26 has the usual tapered region 24B. Third mouthpiece 24 is herein referred to as a given one of a plurality of mouthpieces.

Figure 4:
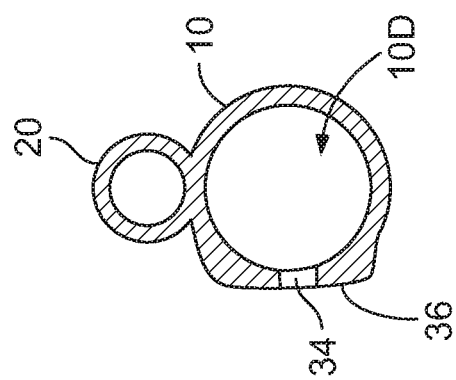
FIG. 4 is cross-sectional view taken through line 3-3 of FIG. 1.
Figure 3:
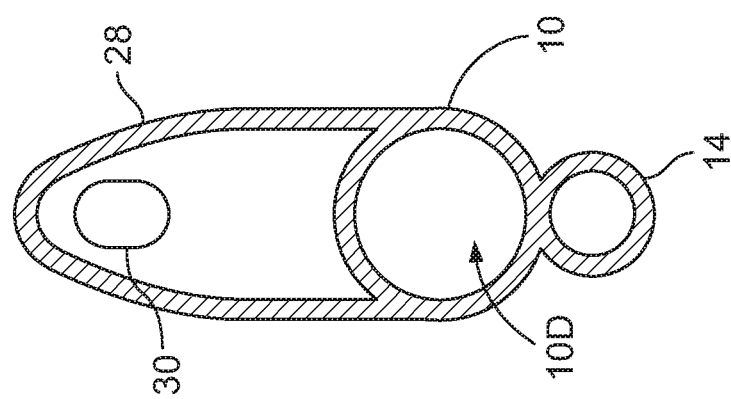
FIG. 3 is cross-sectional view taken through line 3-3 of FIG. 1.

Referring to FIGS. 2-4, embouchure hole 34 is shown piercing lip plate 36. Embouchure hole 34 penetrates into and communicates with air channel 10D (FIGS. 3 and 4) inside elongate body 10. In FIG. 4 embouchure hole 34 is displaced approximately 90° counterclockwise from connector 20.

Figure 5:
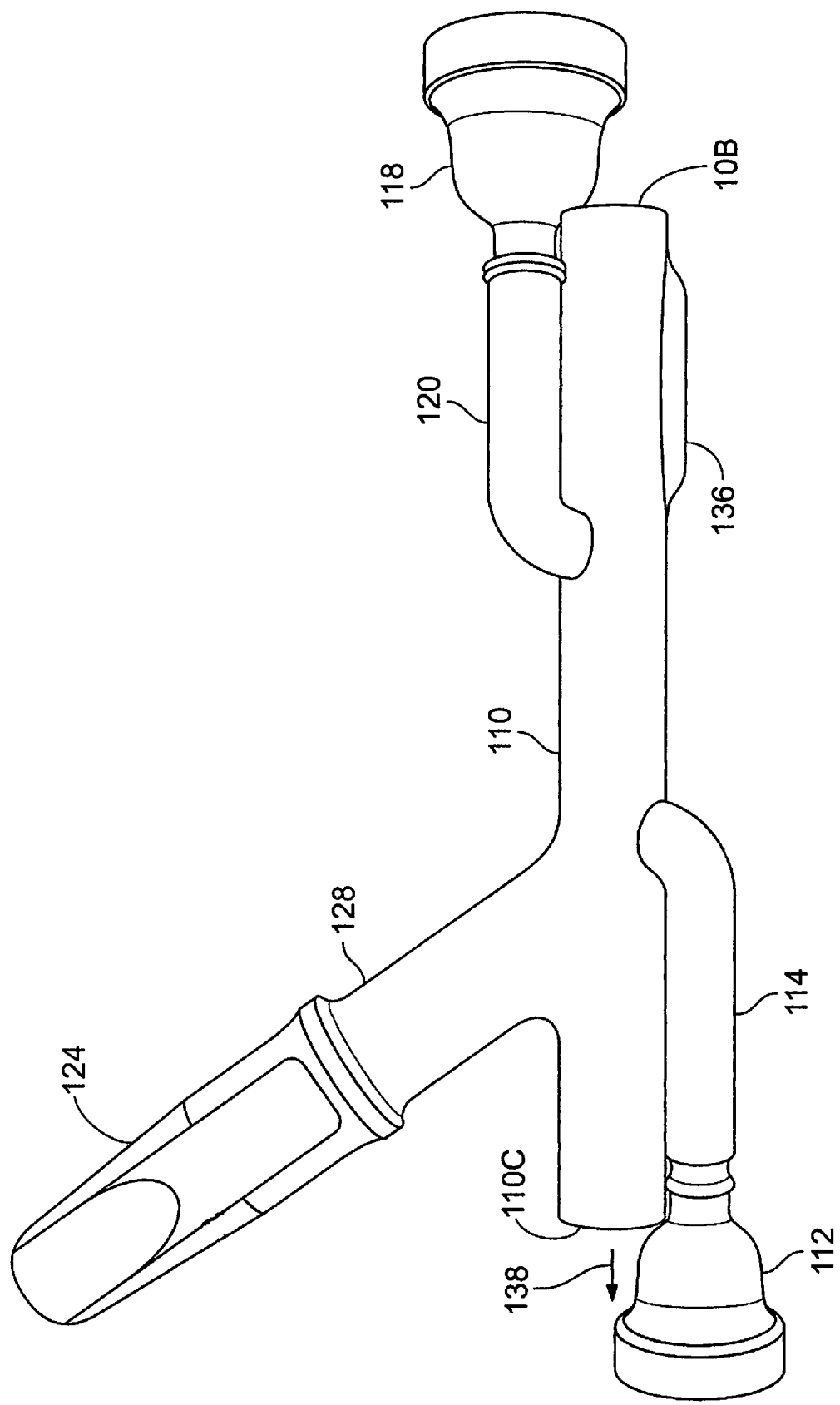
FIG. 5 is a dorsal view of a device that is an alternate to that of FIG. 1.

Referring to FIG. 5, components corresponding to those shown in FIG. 1 have the same reference numerals but raised by 100. As before, mouthpiece 124 and coaxial connector 128 diverge from elongate body 110 at an angle of approximately 45°. In this embodiment, however, air blown into mouthpiece 124 flows into the air channel in elongate body 110 to discharge from open end 110C, as indicated by discharge arrow 138.

The mouthpiece 112 is the same as previously illustrated, and axially connects to connector 114. Connector 114 is basically tubular but its distal end turns inwardly and communicates with the air passage inside elongate body 110. The mouthpiece 118 is the same as previously illustrated, and axially connects to connector 120. Connector 120 is basically tubular but its distal end turns inwardly and communicates with the air passage inside elongate body 110.

Accordingly, air blown into mouthpieces 112 and 118 flow into the air channel inside elongate body 110 to discharge from open end 110C (discharge arrow 138).

Lip plate 136 and its embouchure hole (not shown) is arranged substantially as before and air blown over the embouchure hole will cause an airflow that communicates with open end 110C.

Figure 6:
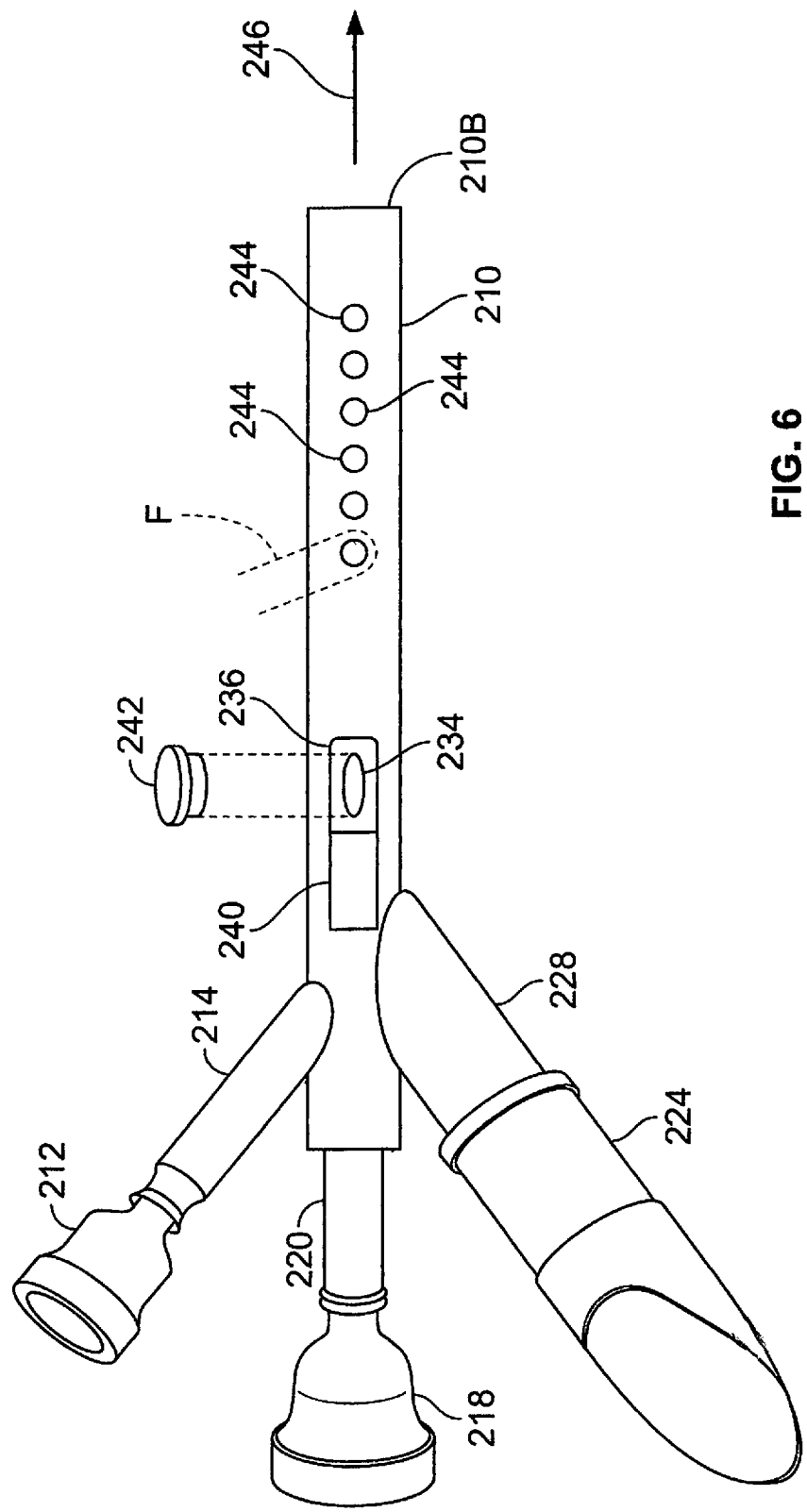
FIG. 6 is ventral view of a device that is an alternate to that of FIG. 2.

Referring to FIG. 6, components corresponding to those shown in FIG. 2 have the same reference numerals but raised by 200. As before, mouthpiece 224 and coaxial connector 228 diverge from elongate body 210 at an angle of approximately 45° in a plane containing the central axis of the elongate body 210. Mouthpiece 212 and coaxial connector 214 also diverge from elongate body 210 at an angle of approximately 45° in a plane containing the central axis of the elongate body 210. Mouthpiece 218 and coaxial connector 220 also diverge from elongate body 210 at an angle of approximately 45° in a plane containing the central axis of the elongate body 210.

These three planes occupied by mouthpieces 212, 218, and 224 are equiangularly spaced apart by 120°. Spaced in this fashion, each of the mouthpieces 212, 218, and 224 provide mutual clearance so that each mouthpiece can be easily accessed without interference from a nearby mouthpiece.

Air blown into any of the mouthpieces 212, 218, and 224 will flow through their respective connectors 214, 220, and 228 and pass into the air channel inside elongate body 210 before being discharged from open end 210B, as indicated by discharge arrow 246.

Although positioned in a different location, lip plate 236 and its embouchure hole 234 are otherwise arranged substantially as before and air blown over the embouchure hole will communicate with open end 210B. To limit the amount of air bled off by embouchure hole 234 when not in use, an elastomeric stopper 242 can be used to plug the hole. Alternatively, a cover 240 can slide on lip plate 236 to block embouchure hole 234.

Six aligned fingering holes 244 penetrate into the air channel inside elongate body 210. As described further hereinafter, a student can selectively cover fingering holes 244, while blowing through one of the mouthpieces 212, 218, or 224, thereby changing the pitch of the tone emerging from open end 210B. Similarly, the fingering holes in rule 244 can be used to change the pitch of the tone produced when using embouchure hole 234.

Figure 7:
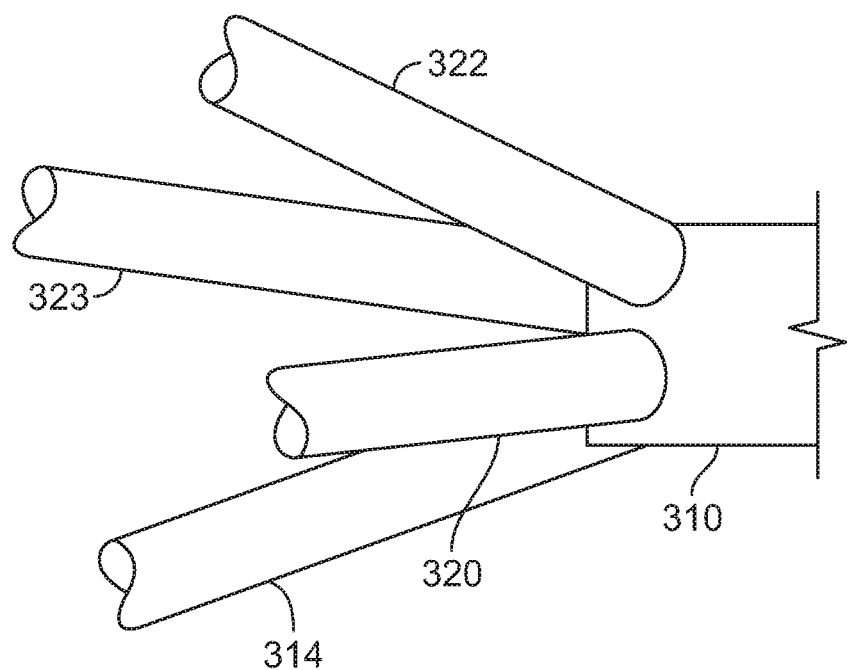
FIG. 7 is schematic view of a device with portions broken away for illustrative purposes, which is an alternate to those previously illustrated.

Referring to FIG. 7, components corresponding to those shown in FIG. 6 have the same reference numerals but raised by 100. FIG. 7 is a schematic diagram showing four connectors 314, 320, 322, and 323, each diverging from elongate body 310 at an angle of 45°. It will be understood that four separate mouthpieces (not shown) are connected to each of the connectors 314, 320, 322, and 323. In this embodiment each of the connectors 314, 320, 322, and 323 lie in a separate plane, each of the four planes intersecting the central axis of the elongate body 310. These four planes are equiangularly spaced apart by 90°.

To facilitate an understanding of the principles associated with the foregoing apparatus, its operation will now be briefly described in connection with the embodiment of FIGS. 1-4. The illustrated device may be a single unitary structure molded from plastic, except for reed 26, which may be a discrete, conventional reed. The illustrated structure can be economically fabricated and assigned to a single student who will not share the device. Thus the device will be hygienic and will not risk transmission of infectious diseases.

The student can begin testing the various mouthpieces 12, 18, and 24 as well as embouchure hole 34, starting, for example, with mouthpiece 24. The lips of the student's mouth M will be placed across the tapered section 26A of reed 26 and across opposing surface 24 B. The student will experience the lip placement and blow-through pressure required to satisfactorily vibrate reed 26, practicing as if the student were playing a clarinet or saxophone. Air blown into mouthpiece 24 will discharge through vent hole 30.

The student can continue practicing over an extended period of time to hone the student's skill with mouthpiece 24, or the student can perform this exercise briefly before trying a different mouthpiece.

The student may now select, for example, mouthpiece 12. The student will experiment with lip placement and blow-through pressure to create the buzzing needed to play an instrument such as the trumpet. Air blown into mouthpiece 12 will be discharged from connector 14 as indicated by discharge arrow 16. As before, the student can continue practicing over an extended period of time to hone the student's skill with mouthpiece 12, or the student can perform this exercise briefly before trying a different mouthpiece.

The student may now select, for example, mouthpiece 18. The student will again experiment with lip placement and blow-through pressure to create the buzzing needed to play an instrument such as the trombone. Air blown into mouthpiece 18 will be discharged from connector 20 as indicated by discharge arrow 22. Again, the student can continue practicing over an extended period of time to hone the student's skill with mouthpiece 18, or the student can perform this exercise briefly before trying a different mouthpiece.

The student may now select, for example, embouchure hole 34 and lip plate 36. The student will experiment with lip placement and blowing pressure to cause the air vibration in air channel 10D of elongate body 10 that is needed to play an instrument such as a flute. Air blown across embouchure hole 34 will cause an airflow that communicates with open end 10C. Again, the student can continue practicing over an extended period of time to hone the student's skill with embouchure hole 34, or the student can perform this exercise briefly before trying a different mouthpiece.

The student can practice with the various mouthpieces and the embouchure hole in any order, and may, if desired, skip some of them. The student can use the illustrated device in multiple sessions, thereby gaining familiarity with the various mouthpieces and the embouchure hole. The student will eventually select the embouchure hole or one of the mouthpieces for more intense practice and training. Even after this selection is made, the student may choose to continue practicing with the illustrated device before beginning to practice with an actual instrument.

The device of FIG. 5 will be used in the same manner except that the embouchure hole and the mouthpieces will all communicate with the same open end 10C.

The device of FIG. 6 will be used in a somewhat different manner. Each of the mouthpieces 212, 218, and 224 are all located at the same end of elongate body 210, and diverge away from each other so that any mouthpiece can be played without interference from neighboring mouthpieces. Each of the mouthpieces 212, 218, and 224 will communicate with the air channel of elongate body 210 and will produce air vibrations therein. When using mouthpieces 212, 218, and 224 the student may insert stopper 242 into embouchure hole 234 to prevent a loss of air through that hole. Alternatively, embouchure hole 234 may be blocked by sliding cover 240 over the hole. Of course, when one wishes to practice using embouchure hole 234, no plug or cover is used to block the hole. It will be understood that if cover 240 is present stopper 242 can be eliminated, and vice versa.

A significant difference with the embodiment of FIG. 6 is the inclusion of a number of fingering holes 244. When using the embouchure hole 234 or one of the mouthpieces 212, 218, or 224, the student may place one or more fingers F over the fingering holes, much like when one is playing a recorder. Accordingly, the student can change the tone emanating from elongate body 210 by changing the fingering of holes 244.

The operation of the embodiment of FIG. 7 is similar to that described in connection with FIG. 6, except that four mouthpieces will be available at one end of elongate body 310.

It is appreciated that various modifications may be implemented with respect to the above described embodiments. While the foregoing disclosure described buzzing with bell-shaped mouthpieces and blowing over an embouchure hole, the device can employ any type of mouthpiece or hole for producing notes. For example, known wind instruments may use a fipple (e.g., tin whistle, recorder, fipple flutes, duct flutes, tubular-ducted flutes, etc.). In addition, the elongate body may have multiple or no embouchure holes. Moreover, mouthpieces may have reeds that are integral, a substandard plastic, or are attached by sliding into lateral slots or under a ledge. Furthermore, in some cases the reed may be secured with a snap connection. Also, while an elongate body with cylindrical surfaces is disclosed, some embodiments may have surfaces that are conical or prismatic. Also, the axis of the elongate body can be curved, serpentine, spiral, zig zag, etc. Furthermore, the elongate body may be closed on both or neither end. In addition, the foregoing variations in the shape of the elongate body can also be applied to the connectors supporting the mouthpieces. Also, mouthpieces can diverge perpendicularly or at acute (and obtuse) angles at multiple, axially spaced and circumferentially spaced locations. In some embodiments, the mouthpiece and its connector can be integral and replaced together as a unit. Some devices may have multiple mouthpieces, where some communicate with an air channel inside the elongate body, while other mouthpieces on that elongate body do not so communicate. Some embodiments may have fingering holes that are stopped by lever devices such as found on a clarinet. Also, some devices may have an axial mouthpiece in addition to multiple mouthpieces that are spaced from the elongate body laterally and/or angularly. While embodiments are shown with angularly diverging mouthpieces lying in multiple planes that are equiangularly spaced, in some embodiments the plane to plane spacing need not be equiangular. Furthermore, certain angularly diverging mouthpieces may be axially spaced and lie in the same plane, and in some cases the angle of divergence may be in different directions (e.g., forward-leaning and rearward-leaning).

Obviously, many modifications and variations of the present invention are possible in light of the above teachings. It is therefore to be understood that within the scope of the appended claims, the invention may be practiced otherwise than as specifically described.

The invention claimed is:

1. A device for introducing different embouchures to a music student, the device comprising:
   a plurality of different mouthpieces, each of said plurality of different mouthpieces configured to introduce a different embouchure; and
   an elongate body having a central axis and a plurality of connectors affixed to the elongate body, the plurality of connectors being adapted to hold and support the plurality of different mouthpieces, each of the plurality of different mouthpieces being external to the elongate body, each of the plurality of different mouthpieces having an internal airway providing an air passage along a working axis, the working axis of each of the plurality of different mouthpieces being outwardly spaced from the central axis of the elongate body, the working axis of each of the plurality of different mouthpieces extending outwardly therefrom in a different direction.

2. A device according to claim 1 wherein a given one of the plurality of different mouthpieces is angularly oriented to diverge from the central axis.

3. A device according to claim 2 wherein the given one of the plurality of different mouthpieces communicates with a side vent that allows air blown into the given one of the plurality of different mouthpieces to discharge without passing through the elongate body.

4. A device according to claim 2 wherein the elongate body is arranged to permit air blown into the airway of the given one of the plurality of different mouthpieces to discharge through the elongate body.

5. A device according to claim 1 wherein at least one of the plurality of different mouthpieces is positioned alongside the elongate body.

6. A device according to claim 1 wherein at least one of the plurality of different mouthpieces has a working axis that is parallel to and spaced from the central axis.

7. A device according to claim 1 wherein a given one of the plurality of connectors is mounted alongside the elongate body, one of the plurality of different mouthpieces being attached to the given one of the plurality of connectors.

8. A device according to claim 7 wherein another one of the plurality of connectors is arranged to permit air blown into the airway of the associated one of the plurality of different mouthpieces to discharge without passing through the elongate body.

9. A device according to claim 7 wherein the elongate body has an internal air channel along the central axis, the given one of the plurality connectors being arranged to communicate between the internal air channel and the associated one of the plurality of different mouthpieces to permit air blown into the airway of the associated one of the plurality of different mouthpieces to discharge through the internal air channel of the elongate body.

10. A device according to claim 1 wherein the elongate body has an internal air channel along the central axis.

11. A device according to claim 10 wherein the elongate body is tubular along most of its length.

12. A device according to claim 1 wherein the elongate body is arranged to permit air blown into the airway of at least some of at least some of the plurality of different mouthpieces to discharge without passing through the elongate body.

13. A device according to claim according to claim 1 wherein the elongate body is arranged to permit air blown into the airway of at least some of the plurality of different mouthpieces to discharge through the elongate body.

14. A device according to claim 13 wherein the elongate body is tubular along most of its length, the elongate body having a closed end and opposite thereto an open end, at least some of the plurality of mouthpieces being located closer to the closed end than the open end, the elongate body having a plurality of centrally spaced fingering holes operable to give the elongate body an adjustable pitch.

15. A device according to claim 1 wherein the elongate body has an air channel and an embouchure hole communicating with the air channel in order to simulate a flute, the embouchure hole being spaced from most of the plurality of different mouthpieces, the air channel being along the central axis, the plurality of different mouthpieces being at least two in number.

16. A device according to claim 15 wherein the elongate body is tubular along most of its length, the elongate body having a closed end and opposite thereto an open end, the embouchure hole being located closer to the closed end than the open end.

17. A device according to claim 16 comprising a stopper operable to block the embouchure hole.

18. A device according to claim 17 wherein the stopper is a cover mounted to slide between a position covering and a position exposing the embouchure hole.

19. A device according to claim 17 wherein the stopper is a plug adapted to be removably inserted into the embouchure hole.

20. A method employing a plurality of different mouthpieces adapted to be mounted on an elongate body having a central axis, each of the plurality of different mouthpieces configured to introduce a different embouchure, and being outwardly spaced from the central axis of the elongate body, each of the plurality of different mouthpieces having an internal airway providing an air passage along a working axis that is spaced from the central axis of the elongate body, the working axis of each of the plurality of different mouthpieces extending outwardly therefrom in a different direction, the method comprising the steps of:
 selecting successive ones of the plurality of different mouthpieces;
 placing the mouth of a music student on successive ones of the plurality of different mouthpieces by relative motion of the mouth of the student in a direction having a component that is transverse to the central axis;
 holding the elongate body when the mouth is placed on each of the successive ones; and
 blowing in turn into each of the successive ones of the plurality of different mouthpieces in order to introduce different embouchures to the music student.

21. A method according to claim 20 comprising the step of:
 orienting a given one of the plurality of different mouthpieces to angularly diverge from the central axis.

22. A method according to claim 20 wherein in some cases the step of blowing in turn is performed to discharge air without passing through the elongate body.

23. A method according to 20 wherein in some cases the step of blowing in turn is performed to discharge air through the elongate body.

24. A method according to claim 20 wherein a connector is mounted adjacent to the elongate body, the method comprising the step of:
 installing one of the plurality of different mouthpieces on the connector.

25. A method according to claim 20 wherein the elongate body is tubular along most of its length and has closed end and opposite thereto an open end, the elongate body having a plurality of axially spaced fingering holes, the step of blowing in turn being performed to discharge air along the elongate body, the method comprising the step of:
 fingering the fingering holes to adjust the pitch of the elongate body.

26. A method according to claim 20 wherein the elongate body has an air channel and an embouchure hole communicating with the air channel, the air channel being along the central axis, the method comprising the step of:
 blowing across the embouchure hole to cause an airflow in the air channel in order to simulate a flute.

27. A method according to claim 26 employing a stopper, the method including the step of:
 blocking the embouchure hole with the stopper.

* * * * *